United States Patent
Cohen et al.

(10) Patent No.: US 9,790,113 B2
(45) Date of Patent: Oct. 17, 2017

(54) APPARATUS, SYSTEM AND METHOD FOR INTEGRATED FILTRATION AND REVERSE OSMOSIS DESALINATION

(75) Inventors: Yoram Cohen, Los Angeles, CA (US); Panagiotis D. Christofides, Westwood, CA (US); Anditya Rahardianto, Los Angeles, CA (US); Alex R. Bartman, Hillsboro, OR (US); Aihua Zhu, Shoreline, WA (US); Han Gu, Moorpark, CA (US); Larry Xingming Gao, Los Angeles, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 1134 days.

(21) Appl. No.: 13/822,622

(22) PCT Filed: Sep. 14, 2011

(86) PCT No.: PCT/US2011/051626
§ 371 (c)(1),
(2), (4) Date: Oct. 3, 2013

(87) PCT Pub. No.: WO2012/037274
PCT Pub. Date: Mar. 22, 2012

(65) Prior Publication Data
US 2014/0048462 A1 Feb. 20, 2014

Related U.S. Application Data

(60) Provisional application No. 61/382,757, filed on Sep. 14, 2010.

(51) Int. Cl.
*B01D 21/30* (2006.01)
*C02F 9/00* (2006.01)
(Continued)

(52) U.S. Cl.
CPC ............... *C02F 9/00* (2013.01); *B01D 61/12* (2013.01); *B01D 61/22* (2013.01); *B01D 61/58* (2013.01);
(Continued)

(58) Field of Classification Search
None
See application file for complete search history.

(56) References Cited

U.S. PATENT DOCUMENTS 4,414,113 A * 11/1983 LaTerra ............... B01D 61/025
                                                210/321.69
4,865,726 A * 9/1989 De Vries ................ B01D 61/04
                                                   210/137
(Continued)

FOREIGN PATENT DOCUMENTS

JP    2003-245666    9/2003
JP    2008-149285    7/2008
(Continued)

OTHER PUBLICATIONS

Bartman et al., "Minimizing Energy Consumption in Reverse Osmosis Membrane Desalination Using Optimization-Based Control," 2010 American Control Conference, Marriott Waterfront, Baltimore, MD, (2010), pp. 3629-3635.
(Continued)

*Primary Examiner* — Richard Gurtowski
(74) *Attorney, Agent, or Firm* — Foley & Lardner LLP; Cliff Z. Liu

(57) ABSTRACT

An apparatus includes a filtration skid configured to generate a filtrate through at least one of microfiltration and ultrafiltration. The apparatus further includes a desalination skid fluidly connected to the filtration skid. The desalination skid is configured to perform reverse osmosis desalination on the filtrate to generate a permeate, where the filtrate travels from
(Continued)

the filtration skid to the desalination skid without traversing a storage tank. In one embodiment, the apparatus further comprises a controller, where the filtration skid and the desalination skid are integrated to provide self-adaptive operation of the filtration skid and the desalination skid in response to control by at least one of a supervisory controller and a local controller. In one embodiment, the control responds to at least one of temporal variability of feed water quality, a permeate production capacity target, and a permeate quality target.

22 Claims, 9 Drawing Sheets

(51) Int. Cl.
| | |
|---|---|
| *B01D 61/12* | (2006.01) |
| *B01D 61/22* | (2006.01) |
| *B01D 61/58* | (2006.01) |
| *B01D 65/02* | (2006.01) |
| *C02F 1/44* | (2006.01) |
| *B01D 61/02* | (2006.01) |
| *B01D 61/14* | (2006.01) |
| *C02F 103/08* | (2006.01) |

(52) U.S. Cl.
CPC ............. *B01D 65/02* (2013.01); *C02F 1/441* (2013.01); *C02F 1/444* (2013.01); *B01D 61/025* (2013.01); *B01D 61/145* (2013.01); *B01D 2311/10* (2013.01); *B01D 2311/14* (2013.01); *B01D 2311/16* (2013.01); *B01D 2311/24* (2013.01); *B01D 2317/02* (2013.01); *B01D 2317/08* (2013.01); *B01D 2321/04* (2013.01); *B01D 2321/10* (2013.01); *B01D 2321/14* (2013.01); *C02F 2103/08* (2013.01); *C02F 2201/007* (2013.01); *C02F 2201/008* (2013.01); *C02F 2209/005* (2013.01); *C02F 2209/03* (2013.01); *C02F 2209/40* (2013.01)

(56) References Cited

U.S. PATENT DOCUMENTS

| | | | |
|---|---|---|---|
| 8,758,621 B2* | 6/2014 | Zuback | B01D 61/025 210/106 |
| 2005/0139530 A1* | 6/2005 | Heiss | C02F 9/00 210/85 |
| 2010/0292844 A1* | 11/2010 | Wolf | C02F 9/00 700/271 |
| 2014/0251905 A1 | 9/2014 | Schneidewend | |

FOREIGN PATENT DOCUMENTS

| | | |
|---|---|---|
| KR | 20-0373511 Y1 | 1/2005 |
| KR | 10-0893565 B1 | 4/2009 |
| WO | WO 2010/061879 A1 | 6/2010 |
| WO | WO-2014/127313 | 8/2014 |

OTHER PUBLICATIONS

Bartman et al., "Nonlinear Model-Based Control of an Experimental Reverse-Osmosis Water Desalination System," Ind. Eng. Chem. Res., 48(2009), pp. 6126-6136.

Gu et al., "Rapid Reverse Osmosis (RO) Membrane Performance Analysis Using an Autonomous RO Desalination System," Environmental Division, AIChE Annual Meeting, Nashville, TN, 2009, 1 page.

Pascual et al., "Rapid Prototyping of Reverse Osmosis Processes Using Data-Driven Models," AIChE Annual Meeting, Computing and Systems Technology Division, Salt Lake City, UT, 2010, 1 page.

Zhu et al., "Effect of Stream Mixing on RO Energy Cost Minimization," Desalination, 261(2010), pp. 232-239.

Zhu et al., "On RO Membrane and Energy Costs and Associated Incentives for Future Enhancements of Membrane Permeability," Jour of Membrane Science, 344(2009), pp. 1-5.

Zhu et al., "Reverse Osmosis Desalination with High Permeability Membranes—Cost Optimization and Research Needs," Desalination and Water Treatment, 15(2010), pp. 256-266.

International Search Report PCT/US2011/051626 dated Apr. 23, 2012.

* cited by examiner

APPARATUS, SYSTEM AND METHOD FOR INTEGRATED FILTRATION AND REVERSE OSMOSIS DESALINATION

CROSS-REFERENCE TO RELATED APPLICATION

The present application is a National Stage Entry of PCT/US2011/051626, filed Sep. 14, 2011, which claims the benefit of U.S. Provisional Application No. 61/382,757, filed on Sep. 14, 2010, the disclosure of which is incorporated herein by reference in its entirety.

FIELD OF THE INVENTION

The invention relates generally to the field of desalination. More particularly, the invention relates to an apparatus, system and method for integrated filtration and reverse osmosis desalination.

BACKGROUND

Water shortages in many areas of the world have increased the need for more technologically advanced, more efficient, and higher capacity systems for production of drinking water, production of water for agricultural uses, and wastewater reuse. One approach that has been used for water desalination includes a reverse osmosis desalination skid fed from an intermediate storage tank containing water filtered by another approach, such as ultrafiltration or microfiltration. The intermediate storage tank typically separates ultrafiltration modules that feed the storage tank, where filtrate stored in the storage tank is then fed to the reverse osmosis desalination skid.

Because high flow rates through these desalination systems typically require a large intermediate storage tank, these systems can have a correspondingly large system footprint. It may therefore not be possible to deploy these desalination systems in environments in which space is limited. Moreover, the intermediate storage tank can result in additional requirements, such as additional pumps that can further increase the system footprint, and system shutdown control requirements associated with operational emergencies that may result in an empty or a full intermediate storage tank. In addition, backwashing of the ultrafiltration modules has typically been done with filtered water from the intermediate storage tank, or with the permeate output from the reverse osmosis desalination skid. This can reduce the output flow rate and the efficiency of these desalination systems and can further increase size requirements of the intermediate storage tank.

Also, under various field conditions feed water salinity may vary temporally and thus system operation may not be energy optimal, since conventional systems are typically designed to operate at a fixed recovery and/or a fixed feed flow rate. Raw water feed quality can also vary over time, which can affect filtration needs (prior to membrane desalting). Conventional systems typically operate with a cleaning frequency or duration that does not automatically adapt based on feed water quality.

It is against this background that a need arose to develop the apparatus, system, and method for integrated filtration and reverse osmosis desalination described herein.

SUMMARY

One aspect of the invention relates to an apparatus. In one embodiment, the apparatus includes a filtration skid configured to generate a filtrate through at least one of microfiltration and ultrafiltration. The apparatus further includes a desalination skid fluidly connected to the filtration skid. The desalination skid is configured to perform reverse osmosis desalination on the filtrate to generate a permeate, where the filtrate travels from the filtration skid to the desalination skid without traversing a storage tank.

In another embodiment, the apparatus includes a filtration device including a filtration module, the filtration device being configured to generate a filtrate from an input through at least one of microfiltration and ultrafiltration. The apparatus further includes a desalination device fluidly connected to the filtration device, the desalination device configured to perform reverse osmosis desalination on the filtrate to generate a permeate stream and a concentrate stream. In a first mode of operation, the filtration module performs filtration as part of generating the filtrate. In a second mode of operation, the filtration module is configured to receive an output from the desalination device such that the output backwashes the filtration module, where the output includes the concentrate stream.

In a further embodiment, the apparatus includes a filtration device configured to generate a filtrate from an input through at least one of microfiltration and ultrafiltration. The apparatus further includes a desalination device fluidly connected to the filtration device, the desalination device configured to perform reverse osmosis desalination on the filtrate to produce a retentate and a permeate. The apparatus further includes a pump fluidly connected to the filtration device and the desalination device such that the filtrate traverses the pump before being provided to the desalination device. The apparatus further includes a controller configured to adjust a flow rate and a pressure at the input to the filtration device based on a value of the pressure of the filtrate at an inlet of the pump.

Other aspects and embodiments of the invention are also contemplated. The foregoing summary and the following detailed description are not meant to restrict the invention to any particular embodiment but are merely meant to describe some embodiments of the invention.

BRIEF DESCRIPTION OF THE DRAWINGS

For a better understanding of the nature and objects of some embodiments of the invention, reference should be made to the following detailed description taken in conjunction with the accompanying drawings.

Common reference numerals are used throughout the drawings and the detailed description to indicate the same elements. The present invention will be more apparent from the following detailed description taken in conjunction with the accompanying drawings.

DETAILED DESCRIPTION

Definitions

The following definitions apply to some of the aspects described with respect to some embodiments of the invention. These definitions may likewise be expanded upon herein.

As used herein, the singular terms "a," "an," and "the" include plural referents unless the context clearly dictates otherwise. Thus, for example, reference to an object can include multiple objects unless the context clearly dictates otherwise.

As used herein, the term "set" refers to a collection of one or more objects. Thus, for example, a set of objects can include a single object or multiple objects. Objects of a set also can be referred to as members of the set. Objects of a set can be the same or different. In some instances, objects of a set can share one or more common characteristics.

As used herein, the term "adjacent" refers to being near or adjoining. Adjacent objects can be spaced apart from one another or can be in actual or direct contact with one another. In some instances, adjacent objects can be coupled to one another or can be formed integrally with one another.

As used herein, the terms "substantially" and "substantial" refer to a considerable degree or extent. When used in conjunction with an event or circumstance, the terms can refer to instances in which the event or circumstance occurs precisely as well as instances in which the event or circumstance occurs to a close approximation, such as accounting for typical tolerance levels or variability of the embodiments described herein.

As used herein, the terms "optional" and "optionally" mean that the subsequently described event or circumstance may or may not occur and that the description includes instances where the event or circumstance occurs and instances in which it does not.

Description of Embodiments of the Invention

Figure 1:
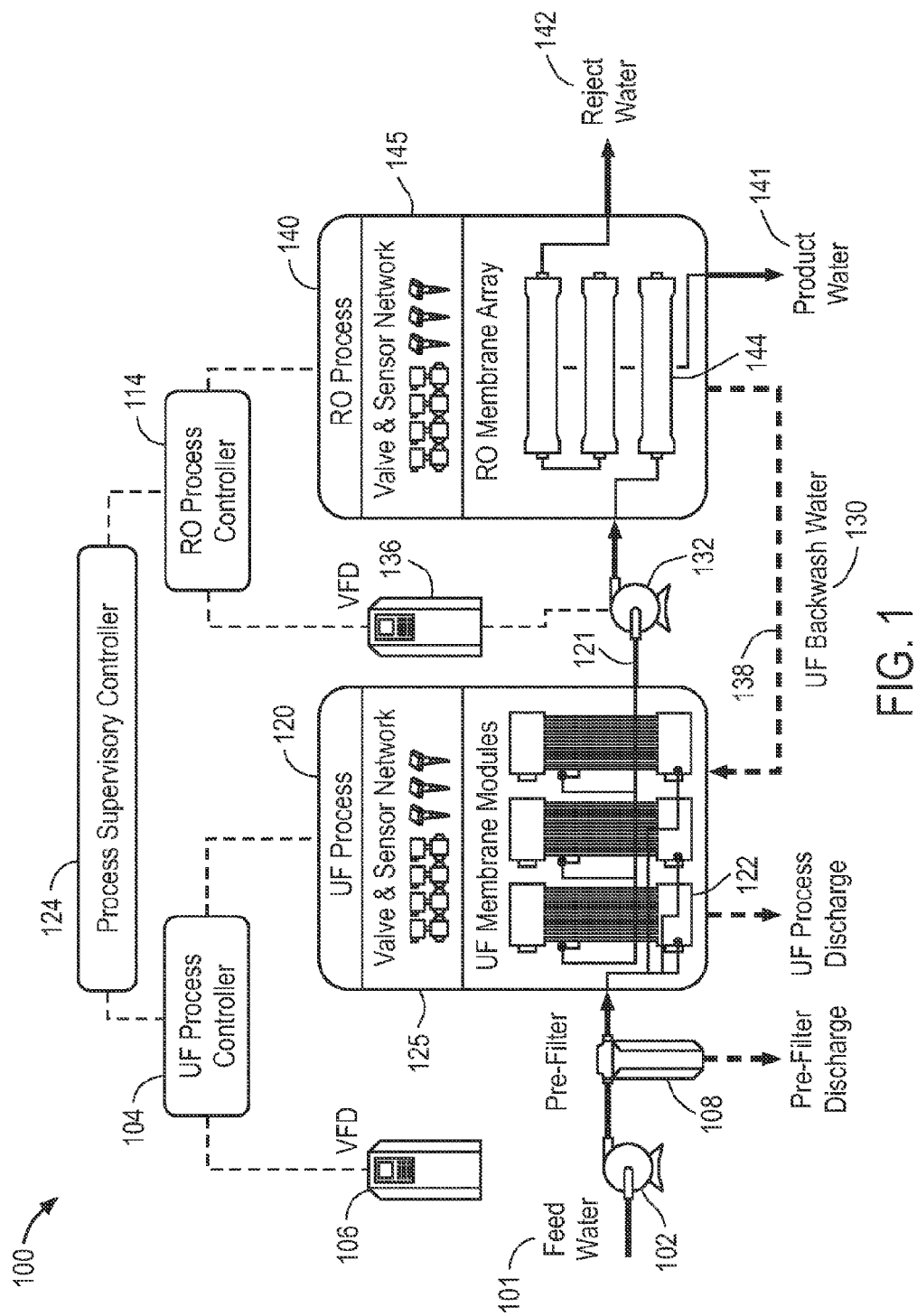
FIG. 1 illustrates an integrated filtration and reverse osmosis desalination system, in accordance with one embodiment of the invention.

Attention first turns to FIG. 1, which illustrates an integrated filtration and reverse osmosis desalination system 100, in accordance with one embodiment of the invention. The system 100 includes a filtration skid (or device) 120 fluidly connected to a reverse osmosis desalination skid (or device) 140. The filtration skid 120 can remove particles, colloids, and bacteria from feed water 101, and can generate a filtrate 121 through at least one of microfiltration and ultrafiltration of the feed water 101 performed by filtration modules 122. In one embodiment, the reverse osmosis desalination skid 140 can perform both membrane desalination and filtration (such as nanofiltration), and may also be referred to as the reverse osmosis desalination skid (or device) 140. In FIG. 1, the filtration skid 120 is illustrated as an ultrafiltration (UF) skid, but is not limited to ultrafiltration. Similarly, other references to ultrafiltration in FIG. 1 are not limited to ultrafiltration, and can apply equally to microfiltration.

In one embodiment, the filtration skid 120 includes one or more of the filtration modules 122, and the reverse osmosis desalination skid 140 includes one or more reverse osmosis desalination modules 144. Each of the modules 122 and 144 may be a vessel that may contain one or more membrane elements.

The reverse osmosis desalination skid 140 is configured to perform reverse osmosis desalination on the filtrate 121 to generate permeate (or product water, or desalted water) 141 and concentrate (or retentate). Some or all of the concentrate may be ejected by the reverse osmosis desalination skid 140 as reject water 142. A portion of the concentrate can be utilized as backwash water 130 for backwashing the filtration modules 122 included in the filtration skid 120. The backwash water 130 may traverse a backwash line 138 to travel from the reverse osmosis desalination skid 140 to the filtration skid 120.

The production level at which the system 100 produces the permeate 141 can be dictated by system controllers including but not limited to controllers 104 and 114, and a supervisory controller 124. In one embodiment, the production level is determined subject to one or more of prescribed production capacity needs, permeate quality, and energy consumption constraints.

The feed water 101 is provided to a pump 102. The pump 102 may be controlled by the controller 104. For example, a feed flow rate and a pressure of an output of the pump 102 may be controlled by the controller 104. In one embodiment, the pump 102 supports variable frequency drive (VFD) control of the pump 102 via a VFD module 106.

In one embodiment, the pump 102 may provide its output to a pre-filter 108. The pre-filter 108 can remove some particles, colloids, and bacteria from the feed water 101 so that the feed water 101 is cleaner upon entry to the filtration skid 120. This can help to reduce one or more of a frequency or a duration of backwashing of the filtration modules 122.

The filtration skid 120 may include a valve and sensor network 125. The sensors in the network 125 measure various system parameters, such as feed flow rate (of the feed water 101), filtrate flow rates through individual filtration modules 122, backwash flow rate (of the backwash water 130), pre-pump pressure (before the pump 102), feed stream pressure (post-pump 102), trans-membrane pressure (pressure measurements on feed and filtrate sides of the filtration modules 122), backwash stream pressure (of the backwash water 130), temperature of the feed water 101, turbidity of the feed water 101, turbidity of the filtrate 121, pH and oxidation reduction potential (ORP) of the filtrate 121, speed of the pump 102, and energy usage of the pump 102. This list is not restrictive, and it is contemplated that other system parameters known to be related by one of ordinary skill in the art may be measured as well. The valves in the network 125 may serve various purposes, such as opening, closing, and varying flow rates through a network of paths interconnecting components included in the filtration skid 120, such as filtration modules 122. The valves in the network 125 may include actuated two-way and three-way valves.

The filtrate 121 is provided to a pump 132. The pump 132 may be controlled by the controller 114. In one embodiment, the pump 132 supports variable frequency drive (VFD) control of the pump 132 via a VFD module 136. For example, a VFD setting of the pump 132 may be controlled by the controller 114 based on a desired feed flow rate to reverse osmosis desalination modules 144 included in the reverse osmosis desalination skid 140.

In one embodiment, a protective filter (not shown) may be placed between the filtration skid 120 and the pump 132. This protective filter can protect the pump 132 from particulate matter in the event of a breach in the integrity of the filtration modules 122.

In one embodiment, the pump 102 may be a centrifugal low-pressure pump with VFD control. The pump 132 may be a high-pressure axial positive displacement pump with VFD control. Alternatively, the pump 132 can be a high-pressure centrifugal pump with a sufficiently large impeller.

The reverse osmosis desalination skid 140 may include a valve and sensor network 145. The sensors in the network 145 measure various system parameters, such as retentate flow rate (of the reject stream 142), permeate flow rate (of the permeate 141), permeate flow rates through individual reverse osmosis desalination modules 144, pre-pump pressure (before the pump 132), post-pump pressure (after the pump 132), feed stream pressure and conductivity (feeding into the reverse osmosis desalination skid 140), retentate stream pressure, conductivity, and pH (of the reject stream 142), permeate stream pressure, temperature, and conductivity (of the permeate 141), retentate valve position (see description with reference to FIG. 6), and speed and energy usage of the pump 132. This list is not restrictive, and it is contemplated that other system parameters known to be related by one of ordinary skill in the art may be measured as well. The valves in the network 145 may serve various purposes, such as opening, closing, and varying flow rates through a network of paths interconnecting components included in the reverse osmosis desalination skid 140, such as the reverse osmosis desalination modules 144. The valves in the network 145 may include actuated two-way and three-way valves.

Advantageously, the filtrate 121 travels from the filtration skid 120 to the reverse osmosis desalination skid 140 without traversing a storage tank. In desalination systems where a storage tank separates filtration modules (such as ultrafiltration modules) from a reverse osmosis desalination skid, the filtration modules typically feed the storage tank a filtrate that is then provided from the storage tank to the reverse osmosis desalination skid. In these desalination systems, the size of the storage tank can be large to support high feed flow rates, and can result in a correspondingly large system footprint. For example, for a small desalination system providing a feed flow rate of approximately 35 gallons per minute, the size of the storage tank may be in the range from about 100 gallons to about 250 gallons, depending on a flow rate from the storage tank needed for backwash of the filtration modules and a safety factor designed to ensure that the storage tank does not become empty or full during normal operation. For a larger desalination system providing a feed flow rate of approximately 350 gallons per minute (ten times 35 gallons per minute), the size of the storage tank may be in the range from about 1000 gallons to about 2500 gallons (ten times the range corresponding to a feed flow rate of 35 gallons per minute).

In the system 100, removal of the storage tank for the filtrate is an important factor that allows embodiments of the system 100 to have a footprint less than 350 cubic feet, such as about 340 cubic feet. The system 100 can therefore be suited for applications that can require the system 100 to fit into small spaces, such as shipboard desalination of up to 18,000 gallons per day of seawater. As described with reference to at least FIGS. 6 through 9, parameters of the system 100 such as pressure and flow rate at various points throughout the system 100 can be controlled to support integrated operation of the filtration skid 120 and the reverse osmosis desalination skid 140 for high feed flow rates, and without the storage tank.

Additionally, in one embodiment, the system 100 includes the single pump 132 between the filtration skid 120 and the reverse osmosis desalination skid 140. The pressure associated with the filtrate 121 output by the filtration skid 120 can be maintained at or above a minimum pressure at an input to the pump 132 by appropriately controlling the pump 102 (see description with reference to FIG. 6), without a need for additional pumps between the filtration skid 120 and the pump 132. For example, in embodiments where the pump 132 is a high-pressure positive-displacement pump, the minimum pressure at the input to the pump 132 can be maintained above a minimum pressure value in the range from about 10 pounds per square inch (psi) to about 15 psi, such as about 14 psi. In contrast, desalination systems having the above-described storage tank can require additional pumps to increase the pressure at the output of the storage tank to a minimum pressure value at an input to a high-pressure pump similar to the pump 132. These additional pumps can increase both the cost and the footprint size of the desalination systems having the above-described storage tank.

Moreover, in desalination systems having the above-described storage tank, additional monitoring of the water level in the storage tank is typically needed to ensure that the water in the tank is not overflowing and that the water level does not drop below a critical level (i.e., leading to pumps running dry or partially dry). Intermittent system operation may also complicate control strategy for these desalination systems due to reaching the limitations of the storage tank. For example, ultrafiltration may have to be shut down if the storage tank is full, or reverse osmosis desalination may have to be shut down if the storage tank is empty. These control and monitoring functions related to the storage tank are not needed in the system 100.

Advantageously, the system 100 can operate adaptively. In one embodiment, the filtration skid 120 and the reverse osmosis desalination skid 140 are integrated to provide self-adaptive operation of the filtration skid 120 and the desalination skid 140 in response to control by at least one of the controllers 104, 114, and 124. The controller 124 may be a supervisory controller that coordinates the local controllers 104 and 114. Alternatively, the controllers 104, 114, and 124 may be combined in a single controller. The control may respond to at least one of temporal variability of quality of the feed water 101, a production capacity target for the permeate 141, and a quality target for the permeate 141. For example, feed filtration by the filtration skid 120 can be operated as a self-adaptive process that responds to changes in feed water quality. For example, one or more of the controllers 104 and 124 can vary backwashing frequency and duration (see description with reference to FIG. 4) of the filtration modules 122 in response to variations in feed water quality. Also, in one embodiment, the system 100 determines its own optimal operating conditions with respect to feed pressure, flow rates and recovery in order to maintain operation at the minimum energy consumption level (see description with reference to FIGS. 6 and 7), while adhering to constraints imposed by water permeate quality.

Figure 2:
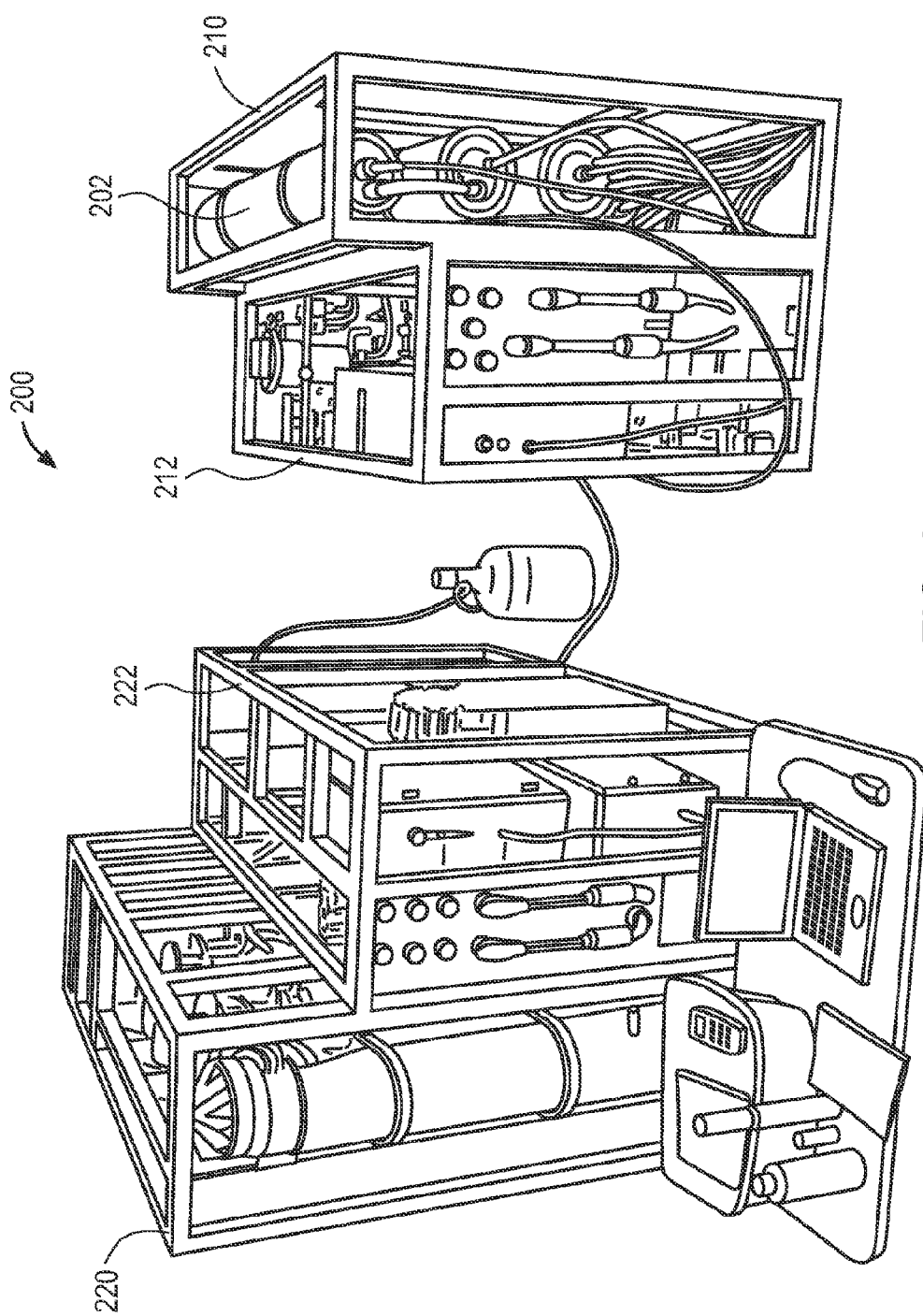
FIG. 2 illustrates a frame-based installation of an integrated filtration and reverse osmosis desalination system, in accordance with one embodiment of the invention.

FIG. 2 illustrates a frame-based installation 200 of the integrated filtration and reverse osmosis desalination system 100, in accordance with one embodiment of the invention. Referring to FIGS. 1 and 2, in one embodiment, the installation 200 of the system 100 deploys portions of the filtration skid 120 and the reverse osmosis desalination skid 140 on separate, detachable frames. For example, with reference to the reverse osmosis desalination skid 140, pressure vessels 202 containing the reverse osmosis desalination modules 144 and the high-pressure pump 132 are on frame 210. Other components associated with the reverse osmosis desalination skid 140, such as the protective filter optionally placed between the ultrafiltration skid 120 and the reverse osmosis desalination skid 140, the valve and sensor network 145, and the VFD module 136, are on frame 212. With reference to the filtration skid 120, the filtration modules 122 are on frame 220. The pump 102, the valve and sensor network 125, and the VFD module 106 are on frame 222.

Advantageously, the frame-based design of the installation 200 is both compact and flexible. As the pressure vessels 202 and the high-pressure pump 132 are located on the frame 210 separate and detachable from the frame 212, the pressure vessels 202 and the high-pressure pump 132 can be replaced (such as with alternate modules) without modifying the components on the frame 212. Similarly, as the filtration modules 122 are located on the frame 220 separate and detachable from the frame 222, the filtration modules 122 can be replaced (such as with alternate modules) without modifying the components on the frame 222. Also, because the frames 210, 212, 220, and 222 are detachable, the frames 210, 212, 220, and 222 can be designed to individually fit through 30"×60" watertight hatch doors of a ship. In this way, the frames 210, 212, 220, and 222 can be separately loaded onto a ship.

Figure 3:
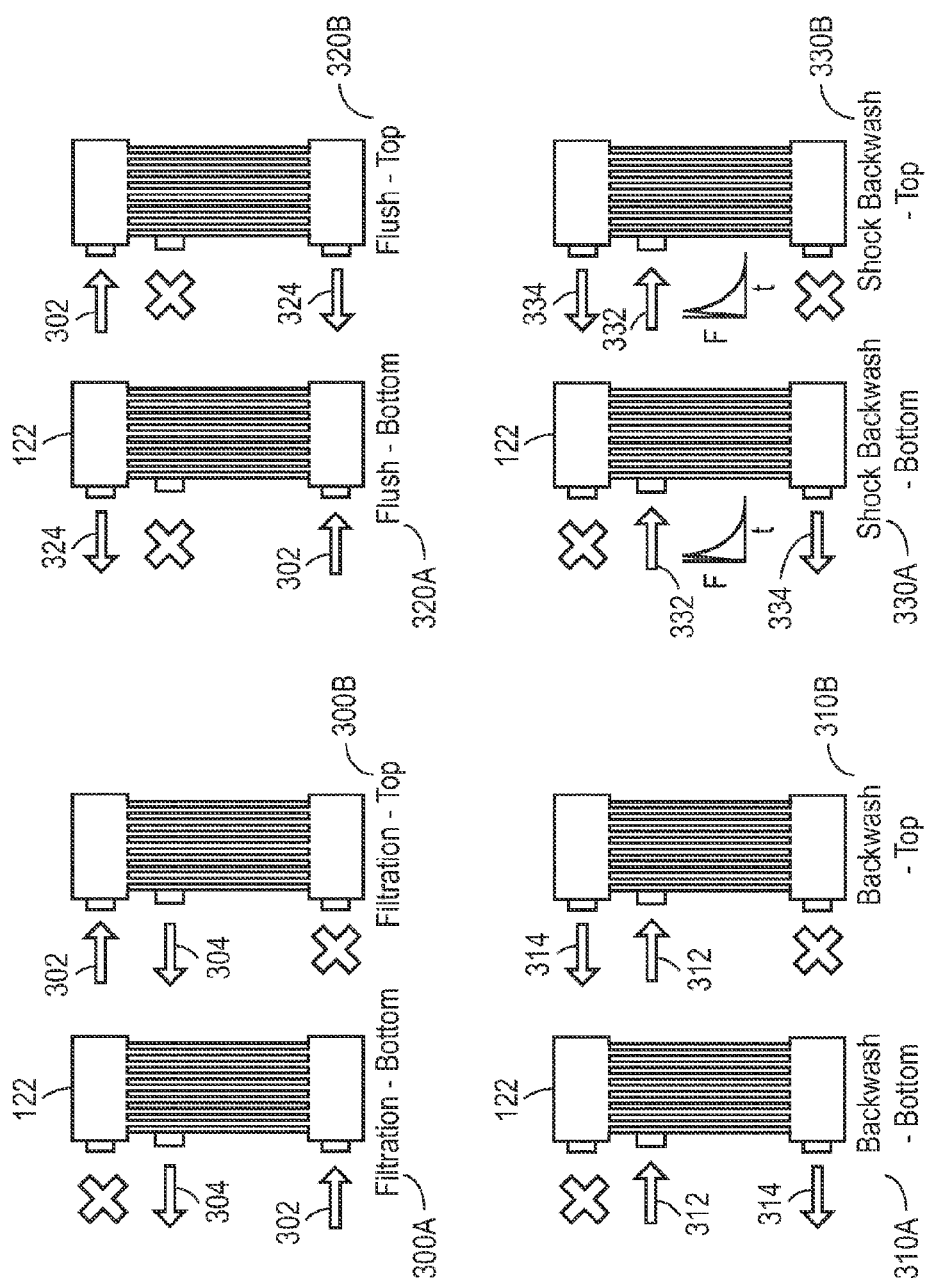
FIG. 3 illustrates various modes of operation of filtration modules, in accordance with one embodiment of the invention.

FIG. 3 illustrates various modes of operation of the filtration modules 122, in accordance with one embodiment of the invention. In one embodiment, each of the filtration modules 122 can be configured into four modes of operation: filtration mode 300, backwash mode 310, flush mode 320, and shock backwash mode 330. Alternatively, each of the filtration modules can be configured into the filtration mode 300 and one or more of the backwash mode 310, the flush mode 320, and the shock backwash mode 330.

In the filtration mode 300, feed water 302 entering the filtration module 122 is filtered by the filtration module 122, producing filtrate 304. In one embodiment, the filtration module 122 may support multiple fluid flow paths, and corresponding sub-modes. For example, in the filtration sub-mode 300A, the feed water 302 enters at the bottom of the filtration module 122, while in the filtration sub-mode 300B, the feed water 302 enters at the top of the filtration module 122. Alternatively, the filtration module 122 may support only one of the sub-modes 300A and 300B.

In the backwash mode 310, fluid flow through the filtration module 122 is reversed from that of the filtration mode 300. Backwash water 312 entering the filtration module 122 cleans filtering elements in the filtration module 122, producing discharge 314. The discharge 314 can be ejected from the filtration skid 120 (see FIG. 1). In one embodiment, the filtration module 122 may support multiple fluid flow paths, and corresponding sub-modes. For example, in the backwash sub-mode 310A, the discharge water 314 is output at the bottom of the filtration module 122, while in the backwash sub-mode 310B, the discharge water 314 is output at the top of the filtration module 122. Alternatively, the filtration module 122 may support only one of the sub-modes 310A and 310B.

In the flush mode 320, the feed water 302 enters the filtration module 122 similarly to the filtration mode 300. However, in this mode, the feed water 302 flushes particulate matter dislodged by backwashing in the backwash mode 310 or the shock backwash mode 330, producing discharge 324. The discharge 324 can be ejected from the filtration skid 120 (see FIG. 1). In one embodiment, the filtration module 122 may support multiple fluid flow paths, and corresponding sub-modes. For example, in the flush sub-mode 320A, the discharge water 324 is output at the bottom of the filtration module 122, while in the flush sub-mode 300B, the discharge water 324 is output at the top of the filtration module 122. Alternatively, the filtration module 122 may support only one of the sub-modes 320A and 320B.

In the shock backwash mode 330, fluid flow through the filtration module 122 is reversed from that of the filtration mode 300. Backwash water 332 entering the filtration module 122 cleans filtering elements in the filtration module 122, producing discharge 334. The difference between the backwash mode 310 and the shock backwash mode 330 is that the backwash water 332 in the shock backwash mode 330 is pulsed so that the backwash water 332 traverses the filtration module 122 in high-flux bursts to dislodge foulants. The discharge 334 can be ejected from the filtration skid 120 (see FIG. 1). In one embodiment, the filtration module 122 may support multiple fluid flow paths, and corresponding sub-modes. For example, in the shock backwash sub-mode 330A, the discharge water 334 is output at the bottom of the filtration module 122, while in the shock backwash sub-mode 330B, the discharge water 334 is output at the top of the filtration module 122. Alternatively, the filtration module 122 may support only one of the sub-modes 330A and 330B.

Referring to FIGS. 1 and 3, in one embodiment, the backwash water 312 and the shock backwash water 332 is obtained from the backwash water 130. The backwash water 130 may be a portion of the concentrate generated by the reverse osmosis desalination skid 140. Alternatively, a portion of the permeate 141, or a mixture of the concentrate and the permeate 141, can be utilized as the backwash water 130.

Referring to FIGS. 1 and 2, by reusing concentrate generated by the reverse osmosis desalination skid 140 for backwashing the filtration modules 122, the efficiency and permeate flow rate of the system 100 can increase compared to a desalination system that uses filtrate (similar to the filtrate 121) or permeate (similar to the permeate 141) for backwashing. Moreover, the pressure vessels 202 containing the reverse osmosis desalination modules 144 can store the concentrate used for backwashing the filtration modules 122, without needing a storage tank.

Referring to FIG. 1, in one embodiment, one or more accumulators can be located along a backwash line 138 (see FIG. 1) through which the backwash water 130 flows from the reverse osmosis desalination skid 140 to the filtration skid 120. In one embodiment, there are two accumulators (each with a 5 liter capacity) located along the backwash line 138. The accumulators allow high pressure pulsed backwash as an additional option for backwashing the UF membranes.

Figure 4:
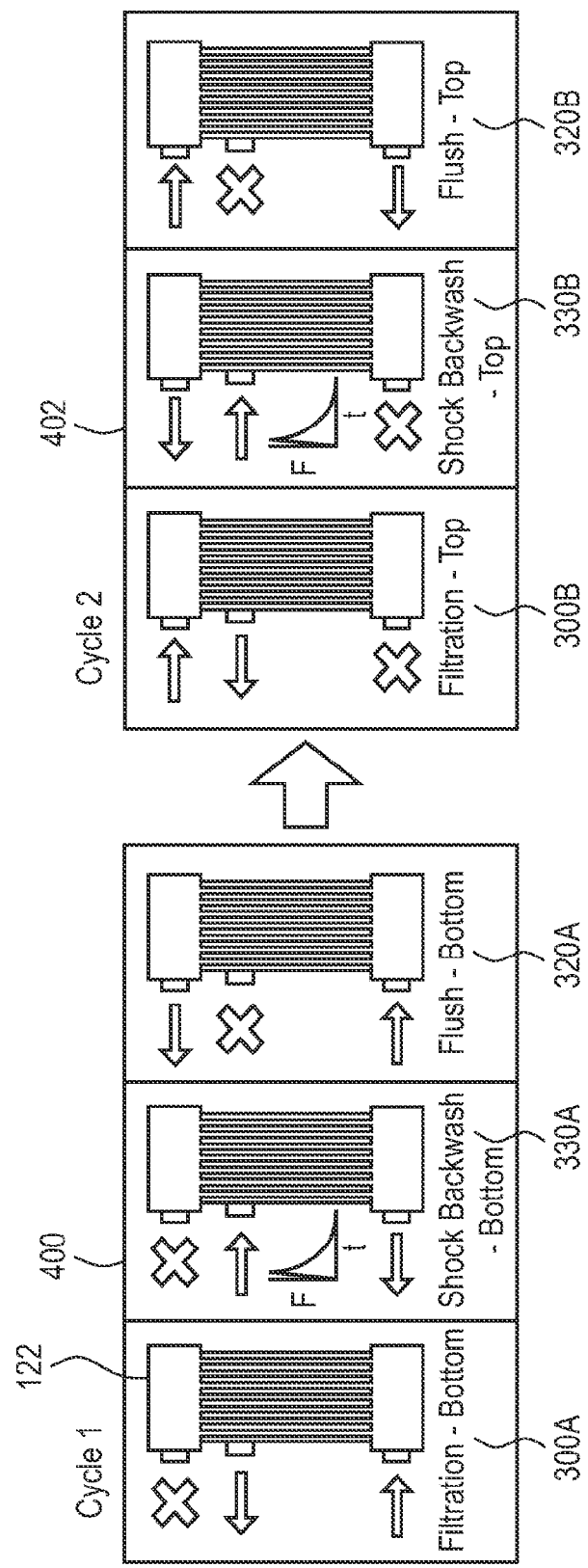
FIG. 4 illustrates a sequencing of various modes of operation of one or more filtration modules, in accordance with one embodiment of the invention.

FIG. 4 illustrates a sequencing of various modes of operation of one or more the filtration modules 122, in accordance with one embodiment of the invention. Referring to FIGS. 1 and 4, in one embodiment, the supervisory controller 124 is configured to determine a sequence in which one or more filtration modules 122 enter at least two of the backwash mode 310, the flush mode 320, and the shock backwash mode 330. For example, the supervisory controller 124 may issue commands to the controller 104 to configure the filtration module 122 to enter a sequence 400 of operating modes including operating in the filtration mode 300A, followed by the shock backwash mode 330A, followed by the flush mode 320A. Alternatively, the sequence 400 of operating modes of the one or more of the filtration modules 122 may include operating in the filtration mode 300A, followed by the backwash mode 310A, followed by the flush mode 320A. Other sequences of these modes of operation known by one of ordinary skill in the art to facilitate backwashing are also contemplated.

In one embodiment, the sequence of operating modes of the filtration module 122 may include the sequence 400, followed by a sequence 402 including the filtration mode 300B, followed by the shock backwash mode 330B, followed by the flush mode 320B. Alternatively, the sequence 402 of operating modes of the filtration module 122 may include operating in the filtration mode 300B, followed by the backwash mode 310B, followed by the flush mode 320B. The configuration of the sequence of operating modes of the filtration module 122 to include the sequence 400 followed by the sequence 402 alternates between use of the bottom filtration path (the mode 300A) and the top filtration path (the mode 300B), which can increase the lifetime of the filtration module 122.

Referring to FIGS. 1 and 4, in one embodiment, the sequences of operating modes of the filtration module 122 can be customized with respect to timing (duration and frequency), pressure, and flow rates. For example, at least one of the frequency or the duration of backwashing of the filtration module 122 can be determined by the supervisory controller 124 based on a membrane permeability of the filtration module 122. The supervisory controller 124 may derive the membrane permeability of the filtration module 122 from measurements made by sensors included in the valve and sensor network 125, such as measurements of filtrate flow rates through the filtration module 122 and the trans-membrane pressure associated with the filtration module 122.

In one embodiment, the supervisory controller 124 may be configured to increase at least one of the frequency and the duration of backwashing of the filtration module 122 based on a comparison of the membrane permeability of the filtration module 122 and a permeability threshold. The comparison may be based on a percentage change in membrane permeability relative to the permeability threshold. For example, if the membrane permeability is 5 percent less than the permeability threshold, then at least one of the frequency and the duration of backwashing of the filtration module 122 may be increased. In other embodiments, this percentage value may be in the range from 1 percent to 10 percent, such as 2 percent, 4 percent, 6 percent, and 8 percent. After backwashing, if the membrane permeability remains less than the permeability threshold, then at least one of the frequency and the duration of backwashing of the filtration module 122 may be increased again. The permeability threshold and the percentage for triggering the increase in at least one of the frequency and the duration of backwashing may be configurable by a user via a remote interface.

Alternatively or in addition, the supervisory controller 124 may be configured to increase at least one of the frequency and the duration of backwashing of the filtration module 122 based on a history of permeability restoration to the filtration module 122 based on previous backwashing of the filtration module 122.

Referring to FIGS. 1 and 4, in one embodiment, each of the filtration modules 122 may be independently configurable into the filtration mode 300 or into at least one of the backwash mode 310, the flush mode 320, and the shock backwash mode 330. When a subset of the filtration modules 122 are in the at least one of the backwash mode 310, the flush mode 320, and the shock backwash mode 330, the filtration skid 120 can be configured to produce the filtrate 121 using a remaining subset of the filtration modules 122 in the filtration mode 300. The reverse osmosis desalination skid 140 can thereby generate the permeate stream 141 and the concentrate stream 142 while the backwashing of the subset of the filtration modules 122 is taking place. The supervisory controller 124 may determine the mode transitions for each of the filtration modules 122 and the corresponding configuration of valves in the valve and sensor network 125 such that the filtration skid 120 uses the remaining subset of the filtration modules 122 to generate the filtrate 121 without interruption. The controller 104 may configure the filtration modules 122 and the valves in the valve and sensor network 125 as defined by the supervisory controller 124.

Figure 5:
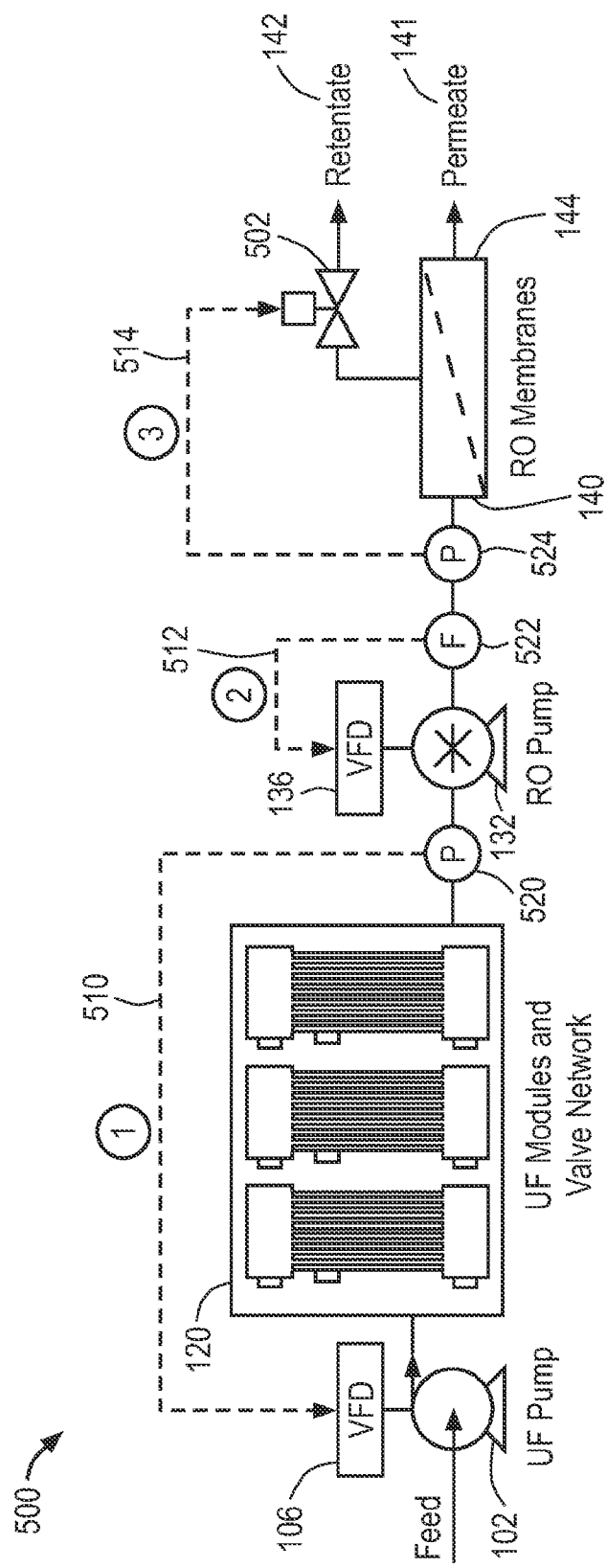
FIG. 5 illustrates an integrated filtration and reverse osmosis desalination system 500, in accordance with one embodiment of the invention.

FIG. 5 illustrates an integrated filtration and reverse osmosis desalination system 500, in accordance with one embodiment of the invention. The system 500 is simplified from the system 100 illustrated in FIG. 1 to illustrate control of the pump 102, the pump 132, and a valve 502 for releasing retentate 142 from the reverse osmosis desalination modules 144. The system 500 relies on one or more controllers (such as controllers 104 and 114 in FIG. 1) to implement multiple control loops to ensure operation at the correct process conditions (e.g., feed flow rate, feed pressure, permeate production rate). The control loops include control loops 510, 512, and 514. System actuators include the VFD module 106 connected to the pump 102 (controls pressure/flow in the filtration skid 120), the VFD module 136 connected to the pump 132 (controlling feed flow rate to the reverse osmosis desalination skid 140 and also influencing pressure), and the actuated retentate valve 502 (controlling the pressure within the reverse osmosis desalination modules 144).

The filtration skid 120 can operate according to the demand of the reverse osmosis desalination skid 140. In one embodiment, the filtration skid 120 can operate up to the maximum flow rate and pressure allowed by the filtration skid 120. For example, the maximum flow rate may be 60 gallons per minute and the maximum pressure may be 70 psi. The control loop 510 keeps an inlet pressure 520 of the pump 132 at a set-point while allowing the pump 132 to deliver a desired feed flow rate.

Referring to FIGS. 1 and 5, in one embodiment, the controller 104 may be configured to adjust a feed flow rate and a pressure at an input to the filtration skid 120 based on a value of the pressure 520 of the filtrate 121 at an inlet of the pump 132. The control loop 510 can use the inlet pressure 520 of the pump 132 as the measured variable. The control loop 510 adjusts the feed flow rate and pressure at the input to the filtration skid 120 so that the pump 132 can deliver the desired amount of feed water to the reverse osmosis desalination skid 140, which relates to the amount of permeate 141 ultimately delivered by the reverse osmosis desalination skid 140. The loop 510 can also ensure the safety of the operation of the pump 132, and can prevent cavitation due to situations where the inlet pressure 520 may be lower than the required net positive suction head (NPSH$_r$, the minimum pressure required at the inlet to the pump 132). In one example, a proportional-integral (PI) controller of the following form can be used:

$$VFD_{set}^{UF} = \qquad (1)$$
$$K_p^1(P_{RO\ inlet}^{sp} - P_{RO\ inlet}(t)) + \frac{K_p^1}{\tau_i^1}\int_0^t (P_{RO\ inlet}^{sp} - P_{RO\ inlet}(\tau))d\tau$$

where $VFD_{set}^{UF}$ is the speed (in RPM) applied to the motor of the pump 102, $K_p^1$ is the proportional gain (in RPM/psi), $P_{RO\ inlet}^{sp}$ is the inlet pressure set-point (in psi) of the pump 132, $P_{RO\ inlet}(t)$ is the current measured inlet pressure (in psi) of the pump 132, and $\tau_i$ is the integral time constant (in seconds).

The controller parameters $K_p^1$ and $\tau_i$ can be determined empirically through testing of a range of proportional gains and integral time constants for a specific system. For example, values of these controller parameters can be chosen to minimize controller overshoot and convergence time to the set-point of the pressure 520. A maximum rate of change of the control action with time can also be used. For example, this value can be set by a user for fine-tuned control over system dynamics.

Referring to FIGS. 1 and 5, in one embodiment, the controller 114 may be configured to adjust a variable frequency drive setting of the pump 132 based on a feed flow rate 522 at an input to the reverse osmosis desalination skid 140. The control loop 512 uses measured feed flow rate 522 to the reverse osmosis desalination modules 144 to adjust the VFD setting of the pump 132. In one example, a linear relationship between the motor speed (RPM) and feed flow rate (in GPM) can be used, where the coefficients for specific systems depend on characteristics of the VFD module 136 and the system capacity:

$$VFD_{set}^{RO} = \left(43.103\frac{RPM}{GPM}\right)Q_f^{desired} - 29.009\ RPM \qquad (2)$$

where $VFD_{set}^{RO}$ is the speed (in RPM) applied to the motor of the pump 102 and $Q_f^{desired}$ is the desired feed flow rate (in GPM) to the reverse osmosis desalination modules 144.

Referring to FIGS. 1 and 5, in one embodiment, the controller 114 may be configured to adjust the valve 502 to control a pressure at an input to the reverse osmosis desalination skid 140. The control loop 514 uses measured feed pressure 524 to the reverse osmosis desalination skid 140 to control the position of the actuated retentate valve 502. The control loop 514 can also use measurements of permeate flow rate (of the permeate 141), feed pressure to the reverse osmosis desalination modules 144, or various other process variables (e.g., pressure of the retentate 142, backwash pressure to the filtration skid 120) as feedback. In one example, the following PI controller can be used to maintain the feed pressure 524 at a set-point:

$$Valve_{set} = \qquad (3)$$
$$K_p^2(P_{RO\ feed}^{sp} - P_{RO\ feed}(t)) + \frac{K_p^2}{\tau_i^2}\int_0^t (P_{RO\ feed}^{sp} - P_{RO\ feed}(\tau))d\tau$$

where $Valve_{set}$ is the position of the actuated retentate valve 502 (in percent open), $K_p^1$ is the proportional gain (in percent/psi), $P_{RO\ feed}^{sp}$ is the set-point feed pressure to the reverse osmosis desalination modules 144 (in psi), $P_{RO\ feed}(\tau)$ is the current feed pressure to the reverse osmosis desalination modules 144 (in psi), and $\tau_i^2$ is the integral time constant (in seconds).

The controller parameters $K_p^2$ and $\tau_i^2$ can be determined empirically through testing of a range of proportional gains and integral time constants for a specific system. For example, values of these controller parameters can be chosen to minimize controller overshoot and convergence time to the set-point of the pressure 524. The control loop 514 also can be operated with a proportional controller and a maximum rate of change of the position of the valve 502 with time. For example, this value can be set by a user for fine-tuned control over system dynamics.

Referring to FIGS. 1 and 5, in one embodiment, the feed flow rate to the pump 132 ($v_f$) is determined through the energy optimization performed by at least one of the controllers 114 and 124. For example, for seawater desalination, which is typically carried out below 50% recovery, and for a specified permeate production, the system will select the lowest flow rate to the pump 132 allowable within the constraints of the available membrane surface area of the reverse osmosis desalination modules 144 and the minimum allowable crossflow velocity within the membrane channels. This in turn lowers the production of the filtrate 121 and therefore also lowers energy consumption by the filtration skid 120. This is an example of integrated control of the filtration skid 120 and the reverse osmosis desalination skid 140 for energy optimization for a given permeate flow rate.

Referring to FIGS. 1 and 5, alternatively or in addition, the controller 114 may adjust the valve 502 based on at least one of conductivity or salinity of the filtrate 121, and based on flow velocity of the retentate 142. The controller 114 may include a linear controller, a nonlinear controller, or both.

Figure 6:
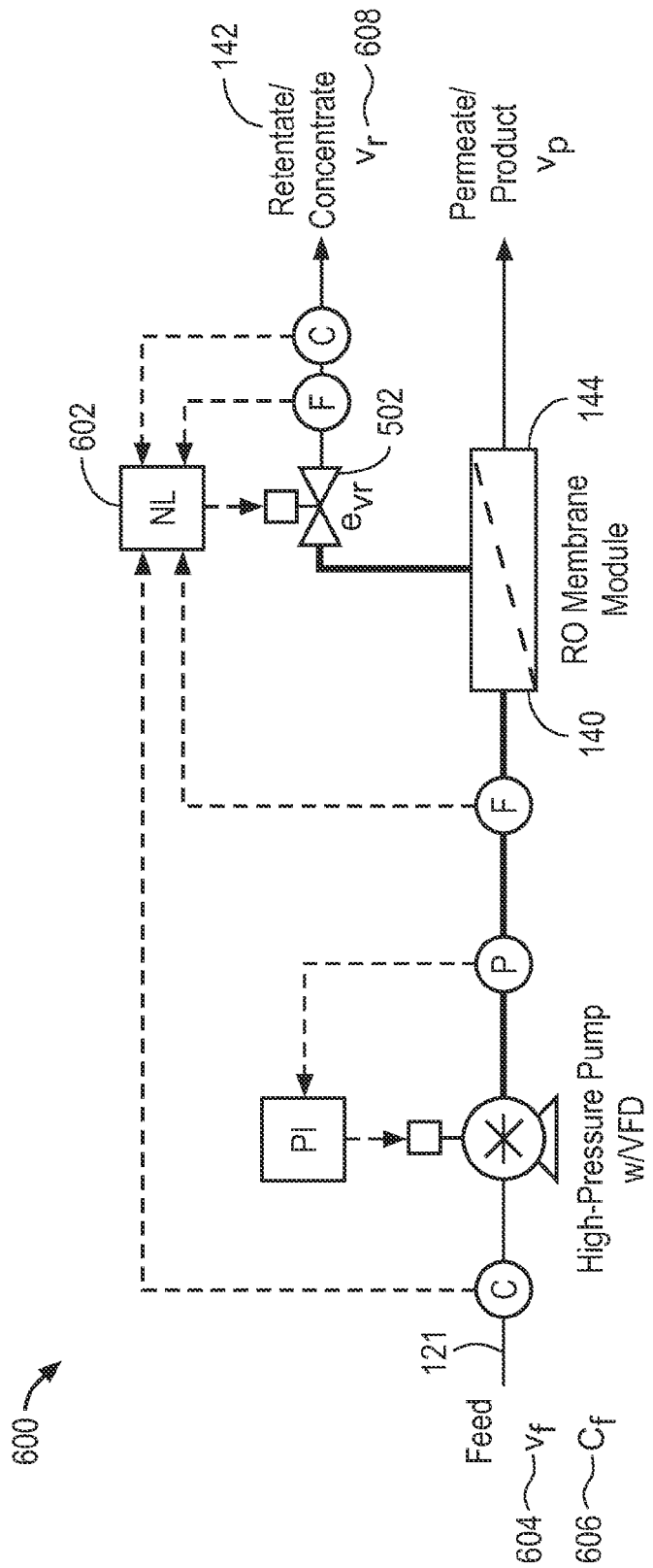
FIG. 6 illustrates a portion of the integrated filtration and reverse osmosis desalination system of FIG. 5, in accordance with one embodiment of the invention.

FIG. 6 illustrates a portion 600 of the integrated filtration and reverse osmosis desalination system 500 of FIG. 5, in accordance with one embodiment of the invention. The portion 600 of the system 500 is chosen to illustrate nonlinear model-based control of the valve 502 for releasing the retentate 142 from the reverse osmosis desalination modules 144. The controller 114 (see FIG. 1) may include a nonlinear controller 602 that may adjust the valve 502 based on at least one of conductivity or salinity of the filtrate 121, and based on flow velocity 608 of the retentate 142.

In one embodiment, the nonlinear controller can utilize the error between the flow velocity of the retentate 142 and its corresponding set-point, and can also takes into account additional system variables. For example, the nonlinear model-based controller can manipulate the actuated position of the valve 502 by using measurements of the feed flow velocity 604 ($v_f$), feed salinity 606 ($C_f$), and the retentate flow velocity 608 ($v_r$), as illustrated in FIG. 6, to bring the system to the desired operating condition (feed pressure to the reverse osmosis desalination skid 140 and flow rate of the retentate stream 142). The nonlinear controller can be designed based on feedback linearization. To derive the controller formula, the following linear, first-order response in the closed-loop system between $v_r$ and $v_r^{sp}$ (set-point of the retentate flow velocity 608) is requested:

$$\frac{dv_r}{dt} = \frac{1}{\gamma}(v_r^{sp} - v_r) \qquad (4)$$

where $\gamma$ is a variable parameter to adjust the magnitude of the response (in seconds). Using this approach, in one example, the following formula is obtained for the nonlinear controller 602 with integral action added to achieve offsetless response:

$$e_{vr} = \frac{\frac{1}{\gamma}(v_r^{sp} - v_r) + \frac{1}{\tau_{NL}}\int_0^{t_c}(v_r^{sp} - v_r)dt}{\frac{-A_p}{2V}(v_r^2)} + \frac{-\frac{A_p^2}{A_m K_m V}(v_f - v_r) - \frac{A_p\delta(T + 273)}{pV}C_{eff}}{\frac{-A_p}{2V}(v_r^2)} \quad (5)$$

where $e_{vr}$ is the resistance of the valve 502, $\tau_{NL}$ is the integral time constant (in seconds), $A_p$ is cross-sectional area of a pipe feeding the reverse osmosis desalination skid 140, $A_m$ is membrane area of the reverse osmosis desalination modules 144, $\rho$ is water density, V is system volume, $K_m$ is an overall feed-side mass transfer coefficient, $\delta$ is an empirical constant used to determine the solution osmotic pressure on the feed-side of the membrane, and $C_{eff}$ is an effective salt concentration on the feed side of the reverse osmosis desalination modules 144.

Figure 7:
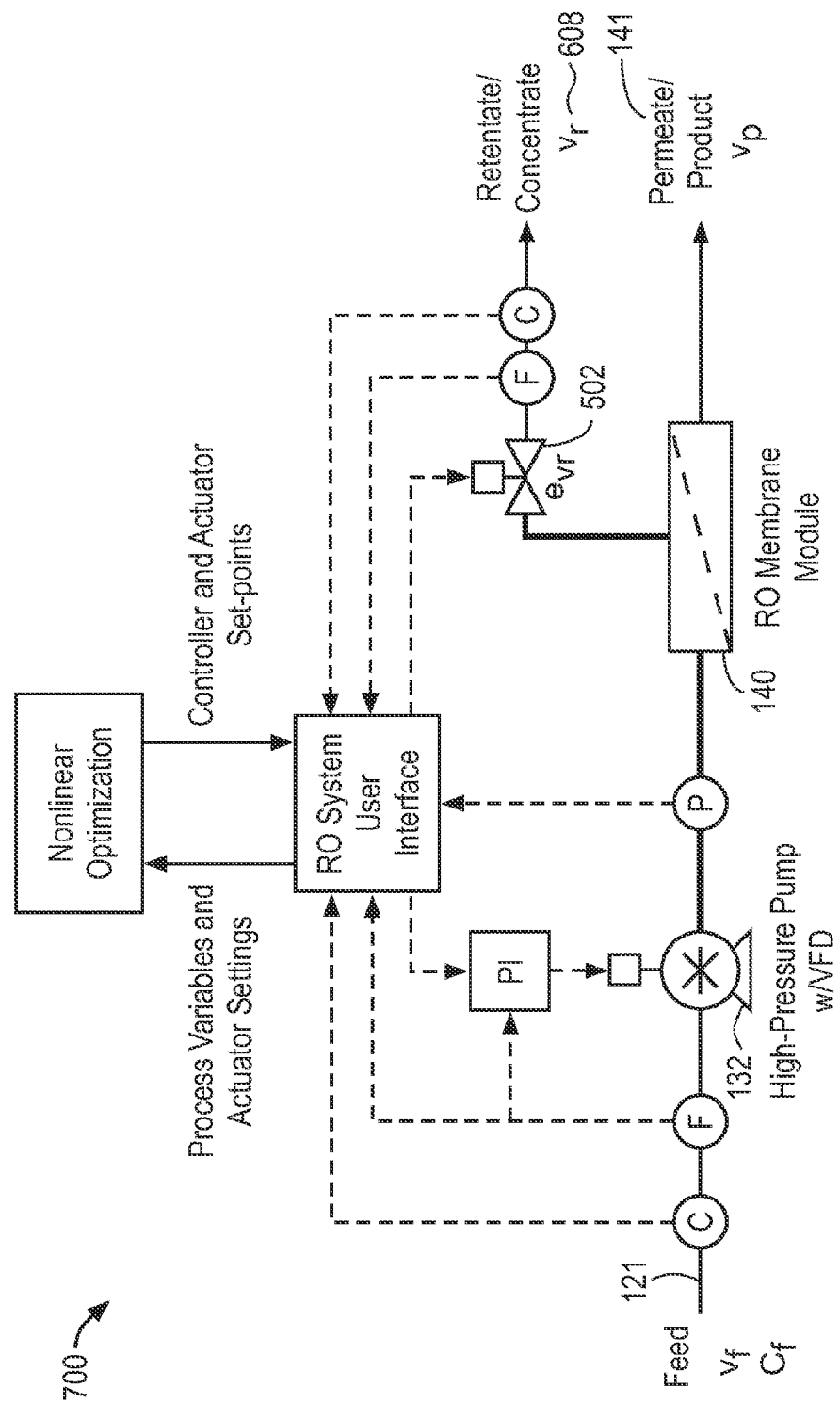
FIG. 7 illustrates a portion of the integrated filtration and reverse osmosis desalination system of FIG. 5, in accordance with one embodiment of the invention.

FIG. 7 illustrates a portion 700 of the integrated filtration and reverse osmosis desalination system 500 of FIG. 5, in accordance with one embodiment of the invention. The portion 700 of the system 500 is chosen to illustrate energy optimization (minimization of specific energy consumption) for the pump 132 and the reverse osmosis desalination skid 140. In one embodiment, at least one of the controller 104 or the supervisory controller 124 (see FIG. 1) can determine a feed flow rate at an input to the reverse osmosis desalination skid 140 such that a production rate of the permeate 141 is greater than or equal to a configurable threshold, and an energy consumption of the reverse osmosis desalination skid 140 and the pump 132 is minimized.

In one embodiment, the energy optimization by at least one of the controller 104 or the supervisory controller 124 determines the values of feed flow rate to the pump 132 ($v_f$, given in m/s) and resistance of the valve 502 ($e_{vr}$, dimensionless) such that the specific energy consumption (SEC) at the operating condition is minimized and appropriate constraints are satisfied. In one example, the optimization problem of minimizing the SEC can be represented as:

$$\min_{v_f, e_{vr}} SEC = \min_{v_f, e_{vr}} \frac{\Delta P}{Y} = \min_{v_f, e_{vr}} \frac{\rho e_{vr}(v_f - v_p)^2 v_f}{2v_p} \quad (6)$$

where $\rho$ is water density and $v_p$ is velocity of the permeate stream 141.

Furthermore, during the energy optimization, several constraints are imposed. In one embodiment, these constraints can include: (1) a constant production rate of the permeate 141; (2) a positive feed flow rate $v_f$; (3) a positive valve resistance $e_{vr}$; (4) a specific energy consumption greater than or equal to zero; and (5) system pressure greater than osmotic pressure at an output of the reverse osmosis desalination skid 140.

Figure 8:
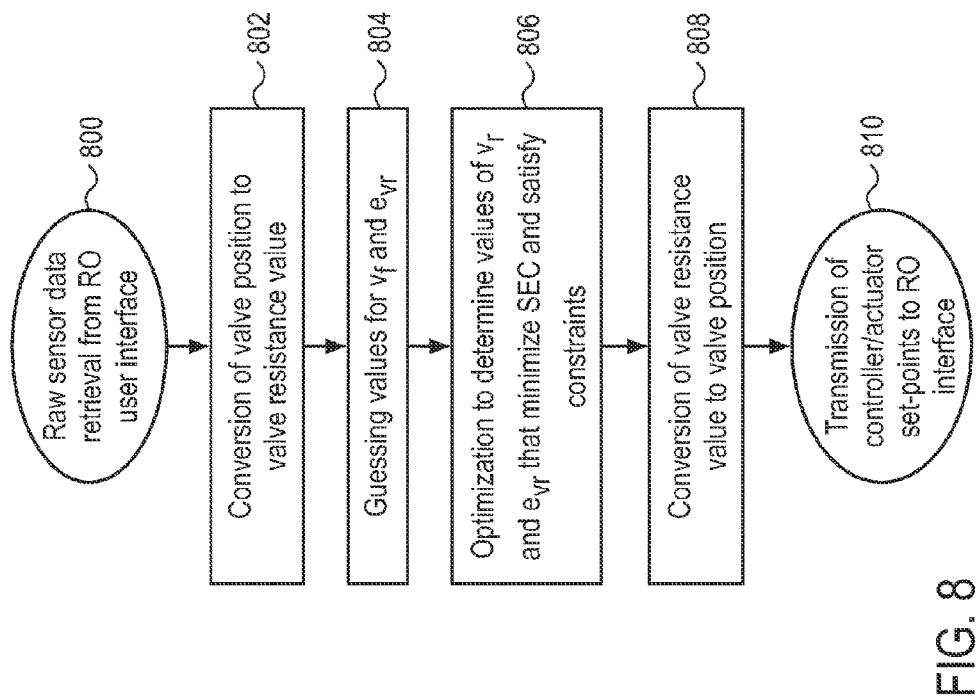
FIG. 8 illustrates operations associated with energy optimization of a portion of the integrated filtration and reverse osmosis desalination system of FIG. 5, in accordance with one embodiment of the invention.

FIG. 8 illustrates operations associated with energy optimization of the portion 700 of the integrated filtration and reverse osmosis desalination system 500 of FIG. 5, in accordance with one embodiment of the invention. In one embodiment, these operations are performed by at least one of the controllers 114 and 124 (see FIG. 1). In block 800, raw sensor data is retrieved from an interface to the reverse osmosis desalination skid 140, such as from an FPGA controller associated with the reverse osmosis desalination skid 140 (see description with reference to FIG. 9). For example, sensor measurements of the conductivity of the feed 121, the flow rate of the feed 121, the position of the valve 502, and the set-point of the flow rate of the permeate 141 can be provided periodically to the controller performing the energy optimization. In block 802, the position of the valve 502 is converted to resistance $e_{vr}$ of the valve 502 in a manner known to one of ordinary skill in the art. In block 804, a value is guessed for the retentate flow velocity 608 ($v_r$) (see FIG. 7) and the resistance $e_{vr}$ of the valve 502. In block 806, values of $v_r$ and $e_{vr}$ are determined that minimize the SEC and that satisfy the constraints described above with reference to FIG. 7. In one example, this is done using a sequential quadratic programming algorithm. In block 808, the resistance $e_{vr}$ of the valve 502 corresponding to the minimum SEC is converted to the corresponding position of the valve 502. In block 810, the corresponding controller/actuator set-points are provided to the interface to reverse osmosis desalination skid 140, such as to the FPGA controller associated with the reverse osmosis desalination skid 140 (see description with reference to FIG. 9).

Referring to FIGS. 1 and 7, in one embodiment, the feed flow rate to the pump 132 ($v_f$) is determined through the energy optimization performed by at least one of the controllers 114 and 124. For example, for seawater desalination, which is typically carried out below 50% recovery, and for a specified permeate production, the system will select the lowest flow rate to the pump 132 allowable within the constraints of the available membrane surface area of the reverse osmosis desalination modules 144 and the minimum allowable crossflow velocity within the membrane channels. This in turn lowers the production of the filtrate 121 and therefore also lowers energy consumption by the filtration skid 120. This is an example of integrated control of the filtration skid 120 and the reverse osmosis desalination skid 140 for energy optimization for a given permeate flow rate.

Figure 9:
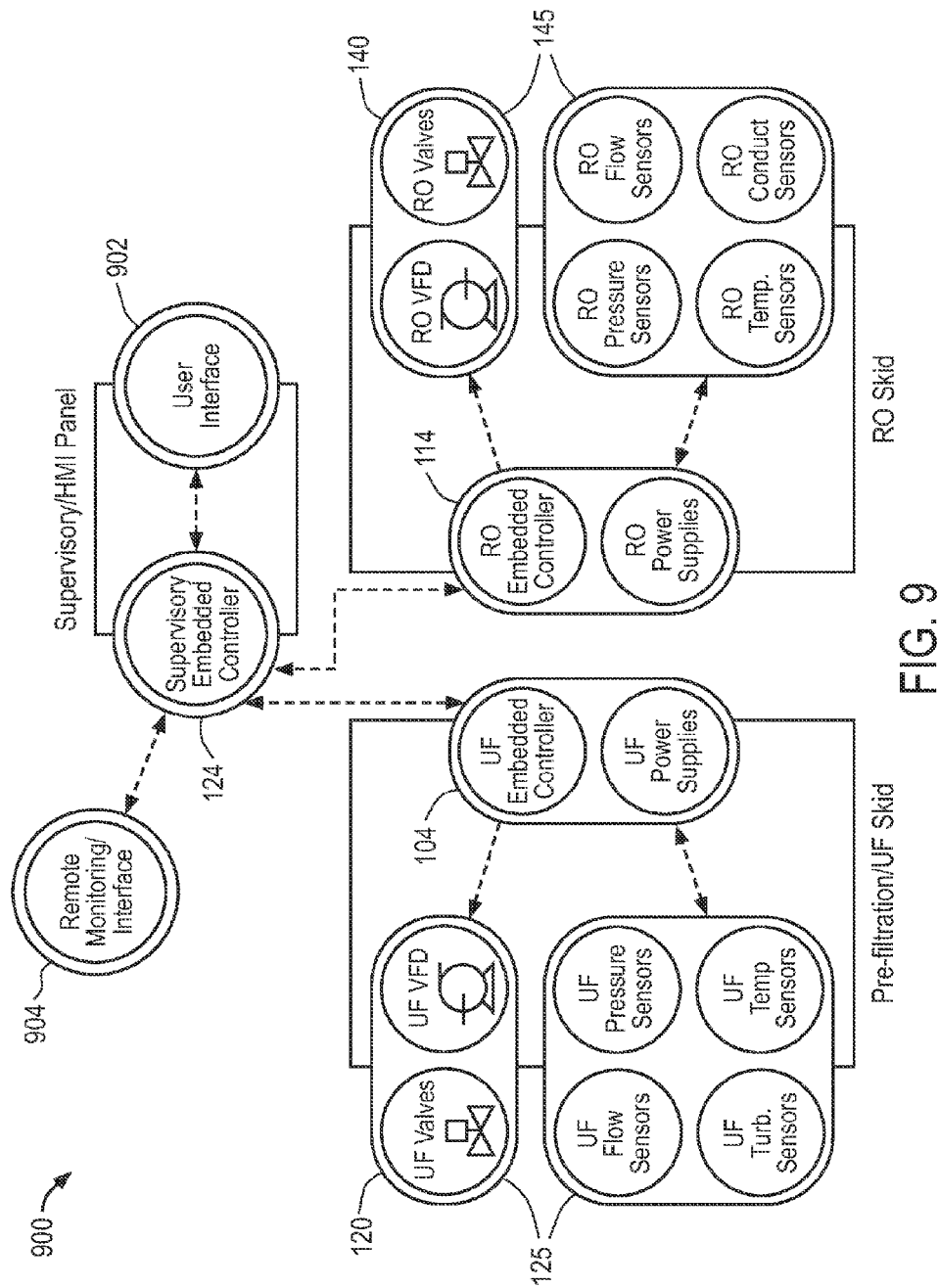
FIG. 9 illustrates a control architecture of the integrated filtration and reverse osmosis desalination system of FIG. 1, in accordance with one embodiment of the invention.

FIG. 9 illustrates a control architecture 900 of the integrated filtration and reverse osmosis desalination system 100 of FIG. 1, in accordance with one embodiment of the invention. The supervisory controller 124 is connected (such as over a wired or wireless network) to a user interface 902 and to a remote monitoring interface 904. The supervisory controller 124 is also connected to the controllers 104 and 114. In one embodiment, the controllers are organized hierarchically such that the supervisory controller 124 coordinates the controllers 104 and 114, the controller 104 controls the filtration skid 120 (including the valve and sensor network 125), and the controller 114 controls the reverse osmosis desalination skid 140 (including the valve and sensor network 145). For example, the controller 104 may provide sensor data associated with the filtration skid 120 to the supervisory controller 124, and the controller 114 may provide sensor data associated with the reverse osmosis desalination skid 140 to the supervisory controller 124. As described below in more detail, the supervisory controller 124 may operate on the received sensor data to make decisions that are transmitted to the controllers 104 and 114. For example, these decisions can include sequencing of operations such as filtration, backwashing, flushing, and shock backwashing (see FIG. 4), and other types of system control.

In one embodiment, the control architecture 900 allows for the division of tasks and resources among distributed embedded controllers in the integrated filtration and reverse osmosis desalination system 100. The control architecture may be implemented in embedded software. The lowest level of code on the controllers 104 and 114 can be FPGA code, which can be responsible for tasks including: (1) collecting data from analog/digital input modules at a desired sampling rate; (2) writing analog output data to analog output modules (such as for continuous actuator control), and actuating relay channels on relay modules (such as for on/off control of 2-way and 3-way valves); (3) safety operations (high/low actuator setting cut-offs, system shut-down in the event of connectivity loss, etc.); and (4) FPGA code initialization/shut-down sequences (turning on/off chassis LED to indicate FPGA code operation, setting I/O channels to defaults).

In one embodiment, the code layered above the FPGA code on the controllers 104 and 114 may be real-time controller (RTC) code. For example, the real-time controller code may be executed on an embedded CPU with dedicated memory. The real-time controller code on the controllers 104 and 114 can be responsible for: (1) obtaining and transmitting sensor/control data to/from the FPGA; (2) basic calibrations of sensor data, using either factory calibration values (if the supervisory controller 124 is not present), or field calibration values obtained empirically (when the supervisory controller 124 is connected and operational); (3) storing component locations (i.e., which components are connected to which channels on the chassis I/O modules) and sorting sensor data so that the sensor measurements appear in the correct indicators on the GUI (also for quick reconfiguration in the event that new equipment is connected, or old equipment wiring is re-arranged); (4) data logging at low frequency for emergency backup data storage; (5) local control calculations for utilization of basic control algorithms (P/PI/PID), also available in the event that the supervisory controller is not functioning or disconnected; (6) continuous connectivity testing to determine which hardware targets are connected to the local network and are operational; (7) basic process sequences and decision-making logic in the event that the supervisory controller is not functioning or disconnected; and (8) remote access for troubleshooting and process monitoring. The real-time code can also include a process-specific graphical user interface (GUI) for use in the event that the FPGA/RTC target becomes inaccessible and must be debugged/fixed. This GUI can contain a process flow diagram along with displays of all of the local sensor readings and the ability to control the local actuators.

For example, in standard operation, RTC code executing on the supervisory controller 124 can send sensor calibration values (multiplier and bias) to the RTC code executing on the controllers 104 and 114 for application to incoming sensor data. In the event that the supervisory RTC code terminates unexpectedly or the hardware becomes disconnected, the controllers 104 and 114 can detect the connectivity loss, and begin to use the factory default calibration values for incoming sensor data. This process can be utilized to switch between the decision making processes located on the supervisory controller 124 and the emergency sequences located in the controllers 104 and 114. Advantageously, the controllers 104 and 114 can maintain operation of the integrated filtration and reverse osmosis desalination system 100 of FIG. 1 in the event of failure of the supervisory controller 124.

In one embodiment, the supervisory controller 124 obtains sensor/actuator data from the filtration skid 120 and the reverse osmosis desalination skid 140 from the controllers 104 and 114, respectively. RTC code executing on the supervisory controller 124 is responsible for extensive decision-making logic which can be coded, in one example, in the form of statecharts. These statecharts are a graphical representation of decision-making logic, where operations are represented in the form of states and transitions. The transitions between different flow patterns (backwashing, filtration, flushing, etc.) can be encoded in base-level statecharts that describe the switching of individual valves and other associated operations of the controllers 104 and 114. These base-level statecharts can then be utilized by higher-level statecharts to sequence the operations in different ways, depending on the process conditions. The supervisory controller 124 operates based on the higher-level statecharts in order to implement adaptive backwashing and various other types of process monitoring/control. These statecharts can also be used to implement fault detection, isolation, and fault tolerant control strategies.

In one embodiment, user input (such as desired permeate production rate) can be provided to the system 100 via a supervisory terminal, such as a PC. The supervisory PC can also alert operators to faults in the system, and can display important system operating parameters. The software on the supervisory PC can perform functions including (but is not limited to): (1) displaying an interactive GUI for easy viewing of current system operation mode; (2) displaying timers for overall system operation as well as time elapsed since the last backwash/filtration sequence; (3) calculations of membrane permeability, membrane fouling, trans-membrane pressure, and other parameters; (4) display of warnings and errors; (5) display of desired production rate of permeate by the system 100; (6) display of results of operating parameter calculations and estimation of backwash frequency of the filtration skid 120; (7) connectivity display showing which hardware targets are connected and operational; and (8) remote server and user connectivity. In one example, the supervisory terminal can interface with the controllers 104, 114, and 124 and with remote systems over a wired or wireless network.

An embodiment of the invention relates to a computer storage product with a computer-readable medium having computer code thereon for performing various computer-implemented operations. The term "computer-readable medium" is used herein to include any medium that is capable of storing or encoding a sequence of instructions or computer codes for performing the operations described herein. The media and computer code may be those specially designed and constructed for the purposes of the invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits ("ASICs"), programmable logic devices ("PLDs"), and ROM and RAM devices. Examples of computer code include machine code, such as produced by a compiler, and files containing higher-level code that are executed by a computer using an interpreter or a compiler. For example, an embodiment of the invention may be implemented using Java, C++, or other object-oriented programming language and development tools. Additional examples of computer code include encrypted code and compressed code. Moreover, an embodiment of the invention may be downloaded as a computer program product, which may be transferred from a remote computer (e.g., a server computer) to a requesting computer (e.g., a client computer or a different server computer) via a transmission channel. Another embodiment of the invention may be implemented in hardwired circuitry in place of, or in combination with, machine-executable software instructions.

While the invention has been described and illustrated with reference to specific embodiments thereof, these descriptions and illustrations do not limit the invention. It should be understood by those skilled in the art that various changes may be made and equivalents may be substituted without departing from the true spirit and scope of the invention as defined by the appended claims. The illustrations may not necessarily be drawn to scale, and manufacturing tolerances may result in departure from the artistic renditions herein. There may be other embodiments of the present invention which are not specifically illustrated. Thus, the specification and the drawings are to be regarded as illustrative rather than restrictive. Additionally, the drawings illustrating the embodiments of the present invention may focus on certain major characteristic features for clarity. Furthermore, modifications may be made to adapt a particular situation, material, composition of matter, method, or process to the objective, spirit and scope of the invention. All such modifications are intended to be within the scope of the claims appended hereto. In particular, while the methods disclosed herein have been described with reference to particular operations performed in a particular order, it will be understood that these operations may be combined, sub-divided, or re-ordered to form an equivalent method without departing from the teachings of the invention. Accordingly, unless specifically indicated herein, the order and grouping of the operations are not limitations of the invention.

What is claimed is:

1. An apparatus comprising:
a filtration skid configured to generate a filtrate through at least one of microfiltration or ultrafiltration of feed water;
a desalination skid fluidly connected to the filtration skid, the desalination skid configured to perform reverse osmosis desalination on the filtrate to generate a permeate and a concentrate, wherein the filtrate travels from the filtration skid to the desalination skid without traversing a storage tank; and
a controller configured to direct operation of the filtration skid and the desalination skid, wherein in a mode of operation, the filtration skid is configured to receive an output from the desalination skid such that the output backwashes the filtration skid, wherein the output includes the concentrate, at least one of a frequency or a duration of backwashing of the filtration skid is determined by the controller based on a membrane permeability of the filtration skid.

2. The apparatus of claim 1, wherein the filtration skid and the desalination skid are integrated to provide self-adaptive operation of the filtration skid and the desalination skid in response to control by the controller.

3. The apparatus of claim 2, wherein the control responds to at least one of temporal variability of feed water quality, a permeate production capacity target, or a permeate quality target.

4. The apparatus of claim 1, further comprising a pump connected between the filtration skid and the desalination skid, and wherein the filtrate maintains a pressure at or above a minimum pressure specified for the pump.

5. The apparatus of claim 1, wherein:
the filtration skid includes a plurality of filtration modules located on a first frame; and
the filtration skid includes at least one valve, at least one pump, and at least one sensor located on a second frame;
wherein the first frame is detachable from the second frame.

6. The apparatus of claim 1, wherein:
the desalination skid includes a reverse osmosis pressure vessel and a pump located on a first frame, wherein the pump is configured to increase pressure of the filtrate provided to the reverse osmosis pressure vessel; and
the desalination skid includes at least one valve and a variable frequency drive of the pump located on a second frame;
wherein the first frame is detachable from the second frame.

7. The apparatus of claim 1, wherein a footprint of the apparatus is less than 350 cubic feet.

8. An apparatus comprising:
a filtration device including a filtration module, the filtration device being configured to generate a filtrate from an input through at least one of microfiltration or ultrafiltration; and
a desalination device fluidly connected to the filtration device, the desalination device configured to perform reverse osmosis desalination on the filtrate to generate a permeate stream and a concentrate stream, wherein the filtrate travels from the filtration device to the desalination device without traversing a storage tank;
wherein in a first mode of operation, the filtration module performs filtration as part of generating the filtrate;
wherein in a second mode of operation, the filtration module is configured to receive an output from the desalination device such that the output backwashes the filtration module, wherein the output includes the concentrate stream; and
wherein:
the filtration device includes a plurality of filtration modules including the filtration module;
each of the plurality of filtration modules is independently configurable into the first mode of operation or the second mode of operation such that when a subset of the plurality of filtration modules are in the second mode of operation, the filtration device produces the filtrate using a remaining subset of the plurality of filtration modules in the first mode of operation.

9. The apparatus of claim 8, wherein the desalination device generates the permeate stream and the concentrate stream while the output backwashes the filtration module.

10. The apparatus of claim 8, wherein:
the output travels from the desalination device to the plurality of filtration modules without traversing a storage tank.

11. The apparatus of claim 8, wherein the output does not include any of the permeate stream.

12. The apparatus of claim 8, further comprising a controller, wherein:
at least one of a frequency or a duration of backwashing of one or more of the plurality of filtration modules is determined by the controller based on a membrane permeability of the corresponding one of the plurality of filtration modules.

13. The apparatus of claim 12, wherein the controller is configured to increase at least one of the frequency or the duration of the backwashing of the one or more of the plurality of filtration modules based on a comparison of the membrane permeability of the one or more of the plurality of filtration modules to a permeability threshold.

14. The apparatus of claim 12, wherein the controller is configured to increase at least one of the frequency or the duration of the backwashing of the one or more of the plurality of filtration modules based on a history of permeability restoration to the one or more of the plurality of filtration modules based on previous backwashing of the one or more of the plurality of filtration modules.

15. The apparatus of claim 8, wherein:
the filtration device further comprises at least one accumulator;
in a third mode of operation, the filtration module is configured to be flushed by the input;
in a fourth mode of operation, the filtration module is configured to be backwashed by a pulsed output of the accumulator, wherein the pulsed output includes the concentrate stream.

16. The apparatus of claim 15, further comprising a controller, wherein the controller is configured to determine a sequence in which the filtration module enters at least two of the second mode of operation, the third mode of operation, and the fourth mode of operation.

17. An apparatus comprising:
a filtration device configured to generate a filtrate from an input through at least one of microfiltration or ultrafiltration; and
a desalination device fluidly connected to the filtration device, the desalination device configured to perform reverse osmosis desalination on the filtrate to produce a retentate and a permeate;
a pump fluidly connected to the filtration device and the desalination device such that the filtrate traverses the pump before being provided to the desalination device; and
a controller configured to adjust a variable frequency drive setting of the pump based on a feed flow rate at an input to the desalination device,
wherein the filtrate travels from the filtration device to the desalination device without traversing a storage tank.

18. The apparatus of claim 17, wherein the controller is a second controller, and further comprising a first controller configured to adjust a flow rate and a pressure at the input to the filtration device based on a value of a pressure of the filtrate at an inlet of the pump.

19. The apparatus of claim 17, wherein the feed flow rate at the input to the desalination device is determined such that:
a production rate of the permeate by the desalination device is greater than or equal to a configurable threshold; and
an energy consumption of the desalination device and the pump is minimized.

20. The apparatus of claim 17, further comprising:
a valve fluidly connected to the desalination device and configured to allow retentate from the desalination device to pass through the valve; and
the controller is configured to adjust the valve to control a pressure at the input to the desalination device.

21. The apparatus of claim 17, wherein the controller is a second controller, and further comprising a first controller and a supervisory controller, wherein:
the first controller provides first sensor data associated with the filtration device to the supervisory controller;
the second controller provides second sensor data associated with the desalination device to the supervisory controller; and
the supervisory controller coordinates operation of the first controller and the second controller based on the first sensor data and the second sensor data.

22. The apparatus of claim 17, further comprising:
a valve fluidly connected to the desalination device and configured to allow retentate from the desalination device to pass through the valve; and
the controller is configured to adjust the valve based on at least one of conductivity or salinity of the filtrate, and based on retentate flow velocity.

* * * * *